United States Patent Office 3,312,599
Patented Apr. 4, 1967

3,312,599
METHOD OF INTRODUCING A COLORED GROUP SENSITIVE TO pH CHANGES INTO ENZYMES BY THE REACTION WITH 2-HYDROXY-5-NITRO-BENZYL BROMIDE
Daniel E. Koshland, Jr., Bellport, and George Latham, East Patchogue, N.Y., and Yashwant D. Karkhanis, Philadelphia, Pa., assignors to the United States of America as represented by the United States Atomic Energy Commission
No Drawing. Original application Mar. 10, 1964, Ser. No. 350,924. Divided and this application Feb. 15, 1966, Ser. No. 544,324
1 Claim. (Cl. 195—68)

This is a division of application S.N. 350,924, filed Mar. 10, 1964.

This invention relates to a novel composition of matter and method of using same.

Currently large research programs are being carried out in the biological field exploring the properties of enzymes. It is of particular interest to researchers in this field to achieve sensitive measurements of enzymatic activities and to ascertain the mechanisms by which enzymes function.

It is an object of this invention to provide those skilled in the art with a new and useful composition of matter.

It is a further object of this invention to provide those skilled in the art with a method of introducing color groups sensitive to pH changes into enzymes.

Other objects of this invention will in part be obvious and will in part appear hereinafter.

We have discovered 2-hydroxy-5-nitro-benzyl bromide, a new composition of matter, which upon reaction with sulfhydryl and tryptophan containing peptides and sulfhydryl and tryptophanyl group containing protein molecules will introduce a colored group sensitive to pH changes into the said peptide and protein molecules.

The following example is given to illustrate our invention:

Ten grams of p-nitro-phenol, 130 milliliters of 47–49% hydrobromic acid, one milliliter of sulfuric acid (concentrated) and 17.5 milliliters of methylal were placed in a three necked flask with a condenser, thermometer and an inlet tube for bubbling hydrogen bromide gas through the reaction mixture. The reaction was stirred with a magnetic stirrer, and heated with a Glas-Col heating mantle maintaining a temperature of 70±2° C. for 4 hours. The reaction flask was then cooled in ice, and the solid contents collected on a sintered glass funnel. After air-drying overnight the solid material was recrystallized twice from about 150 milliliters of hot benzene, with filtering while hot to remove any benzene insoluble substances cooling in an ice-bath, collecting and drying in air to give about 5 grams of a product with a M.P. 145–147° C. Elemental analysis of the product showed C, 36.52%; H, 2.46%; Br, 34.37%. The calculated analysis for $C_7H_6O_3NBr$ was C, 36.23%; H, 2.61%; Br 34.44%. The material was ascertained to be 2-hydroxy-5-nitro-benzyl bromide.

A check on the selectivity of our novel composition of matter was obtained by reaction of the 2-hydroxy-5-nitro-benzyl bromide with an aqueous solution of those amino acids present in α-chymotrypsin, i.e. all the usual ones except cyteine. An amino acid mixture (0.01 M in each amino acid and 0.03 M of 2-hydroxy-5-nitro-benzyl bromide was mixed at pH 3.0). After the reaction was complete, an aliquot was analyzed for amino acids without further treatment. All amino acids were unchanged except tryptophan which had reacted completely.

Several beneficial features obtained from our novel composition of matter are worthy of note. The first is its selectivity which makes it of particular value in modification studies. In proteins which do not contain sulfhydryl groups the reagent is specific for tryptophan. Since it is possible to mask sulfhydryl groups reversibly by methods well known to those skilled in the art, even in proteins containing sulfhydryl groups selective tryptophan reactivity can be obtained. Other reagents which react with tryptophan such as N-bromosuccinimide followed by photooxidation are non-specific and have, therefore, made it difficult to ascertain the role of tryptophan in proteins. The second feature of the reagent is its chromophoric group which is sensitive to changes in environment, absorbing in a region of the spectrum in which the protein itself is transparent. The pH of the phenolic group is this compound is about 7. The acid absorbs in the 320 m$\mu$ region and the basic form absorbs in the 410 m$\mu$ region. Thus the reagent is sensitive to changes in pH and to environmental changes which can be measured in both the 320 m$\mu$ and the 410 m$\mu$ absorption regions. Finally, the extinction coefficient of the protein derivative is sufficiently predictable to allow a calculation of the number of residues absorbed without laborious amino acid analysis, a feature which is frequently necessary in studies of amino acid residue reactivities.

Having described our invention what we desire to secure by Letters Patent is:

A method of introducing a colored group sensitive to pH changes into enzymes comprising reacting 2-hydroxy-5-nitro-benzyl bromide with an enzyme containing at least one member of the group consisting of, sulphydryl peptides, tryptophan containing peptides, sulfhydryl containing proteins and tryptophanyl containing peptides whereby a colored group sensitive to pH changes is added to the enzyme.

No references cited.

A. LOUIS MONACELL, *Primary Examiner.*
L. M. SHAPIRO, *Assistant Examiner.*